United States Patent [19]

Frazee

[11] 4,301,692
[45] Nov. 24, 1981

[54] GEAR SELECTOR HAVING REVERSE INHIBITOR AND BACKUP LIGHT SWITCH

[75] Inventor: William T. Frazee, Plymouth, Mich.

[73] Assignee: Ford Motor Company, Dearborn, Mich.

[21] Appl. No.: 90,951

[22] Filed: Nov. 5, 1979

[51] Int. Cl.³ .......................... G05G 5/10; H01H 3/16
[52] U.S. Cl. ................................ 74/476; 74/477; 200/61.91
[58] Field of Search ............... 74/476, 477; 116/28.1, 116/DIG. 20; 200/61.91; 340/70

[56] References Cited

U.S. PATENT DOCUMENTS

| | | | |
|---|---|---|---|
| 1,116,575 | 11/1914 | Waters | 74/477 |
| 1,131,291 | 3/1915 | Thomas | 74/477 |
| 1,231,655 | 7/1917 | Schmidt | 74/477 X |
| 1,536,953 | 5/1925 | Waters | 200/61.91 |
| 3,418,866 | 12/1968 | Hetmann et al. | 74/477 |
| 3,866,488 | 2/1975 | Nakata et al. | 74/476 X |
| 3,962,930 | 6/1976 | Frazee | 74/477 X |
| 3,987,878 | 10/1976 | Hansen | 74/477 X |

FOREIGN PATENT DOCUMENTS 24400 of 1905 United Kingdom ................. 74/477

Primary Examiner—Allan D. Herrmann
Attorney, Agent, or Firm—Frank G. McKenzie; Donald J. Harrington

[57] ABSTRACT

A gear selector inhibitor and warning signal switch for the power transmission gear selector mechanism of an automotive vehicle having primary torque drive gears and an idler pinion selectively engageable with a drive gear. The inhibitor and switch unit includes a spring biased plunger that urges engagement of the plunger with a bellcrank, which is adapted to move the idler into meshing engagement with the drive gear when the gear shift mechanism transmits shifting motion to the bellcrank. In this condition, the plunger is forced by the shift mechanism out of engagement with the bellcrank and this action operates to make a connection between electrical terminals on the plunger and electrical receptacles for the terminals thereby completing an electrical circuit that produces a sensible warning indication that the shift mechanism has engaged the bellcrank. When the shift mechanism is disposed for drive by other than the idler-engaging drive gear, the shift inhibitor positively locks the bellcrank against errant movement and the warning lamp circuit is opened.

10 Claims, 5 Drawing Figures

GEAR SELECTOR HAVING REVERSE INHIBITOR AND BACKUP LIGHT SWITCH

BACKGROUND OF THE INVENTION

1. Field of the Invention

This invention relates generally to a gear shifting mechanism for an automotive power transmission and more particularly to a mechanism of this type that provides a reverse gear inhibitor and a backup light switch combined in a single unit.

2. Description of the Prior Art

The gear shifting mechanism to which the present invention is directed is specifically of the type that furnishes a reverse idler gear to be moved into driving engagement with the reverse drive gear of the transmission input shaft. A gear selector shaft is manually operated to change the speed ratio of the transmission and to select reverse gear operation.

The gear shifting mechanisms of manually operated power transmissions are generally provided with means adapted to prevent accidential movement of the gear shift levers into positions that would shift the gears to reverse mode of operation when the vehicle operator intends to move the gear shift lever between forward drive gear positions. Inadvertent engagement of the reverse drive gear during forward mode of operation and particularly at high speed would produce catastrophic damage to the transmission and could risk vehicle and passenger safety as well. Known arrangements operative to prevent this inadvertent reverse gear engagement include the use of complicated means for shifting into reverse gear. When shifting between gears, the shift selector shaft is brought to a neutral plane before an engagement with either a forward drive gear or the reverse gear can occur. To avoid inadvertent and accidental reverse gear engagement, the selector shaft in certain prior art devices is required to be pushed downwardly toward the floor of the vehicle or pulled upwardly and then moved from this position into the reverse gear position. Additional known means to avoid accidental reverse gear engagement include requiring that the shift selector, in addition to being moved to the direction of the reverse gear, have buttons, which the drive must push before engaging reverse gear. Use of these techniques, therefore, encumbers the vehicle operator with the complicated and intricate manipulatory steps when shifting gears.

In manually operated transmissions, it is important when shifting between forward gears not only that the vehicle operator avoid placing the selector shaft in a reverse position but also that the shifting mechanism itself positively prevents inadvertent reverse gear engagement regardless of the position of the selector shaft.

Present day vehicles typically provide a warning to vehicular traffic and occasionally to the operator of the vehicle that the transmission is set for reverse operation. This indication is given outside the vehicle by way of the backup light usually mounted in the rear taillight assembly and within the vehicle by a warning light mounted on the dashboard within view of the vehicle operator. It is important in the operation of these warning signals that they be positive and serve to produce the required warning when the vehicle is set for reverse operation.

Gear shift mechanisms of the type herein described have previously included means associated with the shift selector shaft that require the vehicle operator to operate the shaft by applying some motion to the shaft when passing into reverse gear that is not identical to the motion given the shaft when forward gear ratios are selected.

SUMMARY OF THE INVENTION

In manually operated, multiple forward speed transmission shift mechanisms of the type herein described, it is important that the reverse idle gear be positively and securely held in a neutral position out of driving engagement with the reverse gear when the forward gear ratios are operative. During the shifting procedure between forward gear ratios, the reverse inhibitor mechanism aspect of the present invention furnishes such a positive restraint of the reverse idler by requiring mechanical engagement of a spring biased plunger with the reverse idler bellcrank. The nature of the engagement of the plunger with the reverse idler bellcrank is such that the reverse idler gear is held out of driving engagement with the reverse gear at all times during operation of the shift lever except when the lever is specifically and affirmatively positioned for reverse drive.

An additional aspect of the present invention involves provision for a backup light switch to be integrally formed with the reverse inhibitor mechanism. In realizing this objective, the spring biased locking plunger is provided with electrical terminals that engage with electrical receptables mounted on the housing of the locking mechanism. When the plunger is displaced from engagement with the reverse idler bellcrank, the plunger is retracted within the locking mechanism housing and the terminals of the plunger engage the receptacles to complete an electrical circuit that produces a sensible indication of the occurrence by lighting a backup light of the vehicle. The backup light, of course, signifies that the locking mechanism and that the shifting mechanism has engaged the reverse idler for driving engagement with the first gear. This is an affirmative indication that the transmission is disposed for the reverse drive condition. The vehicle wiring harness is connected to the inhibitor mechanism and carries the electrical signal produced by the disengagement of the plunger from the reverse idler bellcrank to the requisite warning signal lamps on the vehicle.

Still another object of the present invention is the provision of a reverse shift inhibitor that requires operator effort in moving the shift selector shaft into a reverse gear in excess of the effort required when shifting between forward drive gear ratios. This aspect of the invention is realized by furnishing the locking plunger with a stiff spring that biases the plunger into engagement with the idler bellcrank. In order to place the transmission in a reverse driving mode, the plunger must be mechanically disengaged from the bellcrank. The force required to overcome the spring force acting on the plunger is transmitted to the plunger by the shifting mechanism, which is controlled by input from the vehicle operator. Before the shifting mechanism can engage the reverse idler bellcrank, the plunger must be forced from engagement with the bellcrank by overcoming the force of the biasing spring. The mechanical spring is preferably selected to have a spring constant that requires a substantially greater force be applied to the shifting lever when reverse operation is desired than when forward speed ratios are selected. This increased force must be applied by a vehicle operator who, sensing the increased force, is thereby notified of having placed the shifting lever in a reverse gear operation. In this way inadvertent shifting into the reverse gear is substantially avoided.

Another object of the invention is provision for a locking mechanism in a single unitary construction that provides the reverse shift inhibitor and the backup light warning switch in a single unit. This aspect of the invention is realized through the medium of the locking plunger, which, in addition to mechanically inhibiting unintended reverse shifting procedures, also functions as part of an electrical switch. The switch is closed when the plunger is retracted within the locking mechanism housing, a function that is initiated by the vehicle operator's control of the shift lever.

DESCRIPTION OF THE PREFERRED EMBODIMENT

Figure 1:
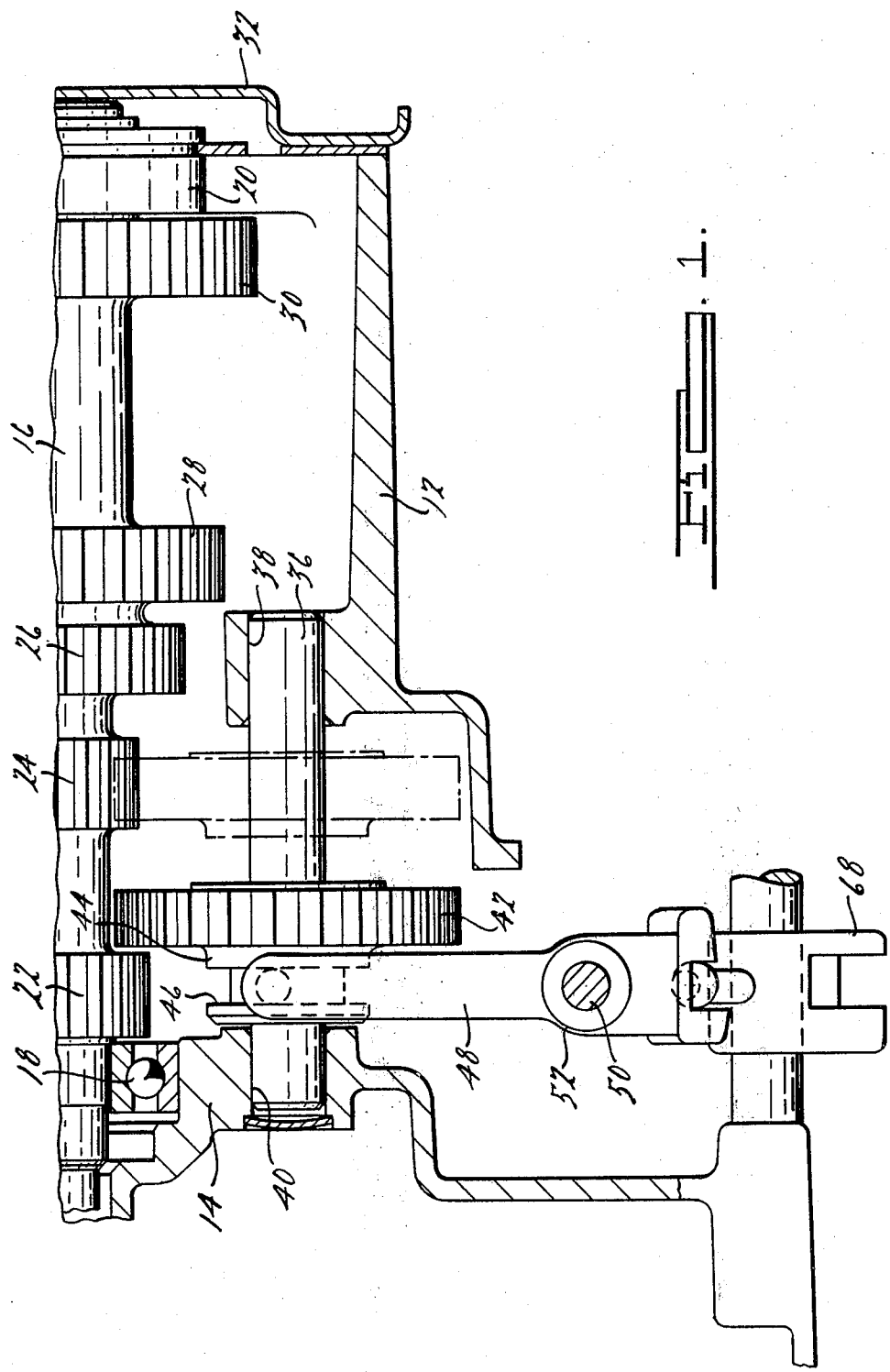
FIG. 1 is a partial longitudinal cross-section of the transmission assembly input shaft gearing arrangement taken through the centerline of the power input shaft and the reverse idler support shaft at plane I—I of FIG. 2.
Figure 2:
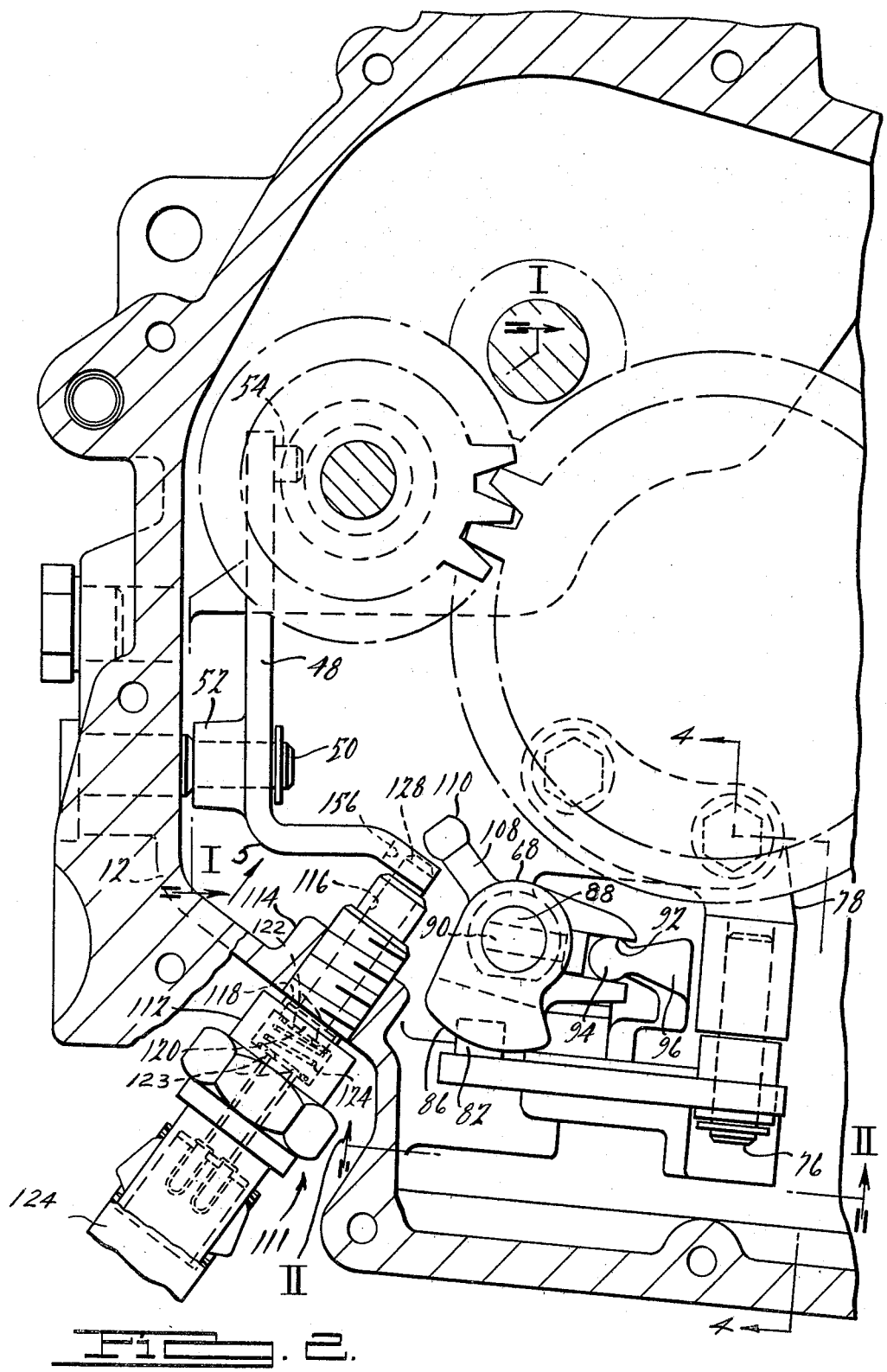
FIG. 2 is a side elevation cross-section through a manual transmission showing the gear shift mechanism.

Referring first to FIGS. 1 and 2, situated within the space defined by the transmission housings 12 is a power input shaft 16 splined at its right extremity to a friction clutch (not shown) that is connected between the crankshaft of an internal combustion engine and the shaft 16. Input shaft 16 is journalled by bearing 18 in an opening defined by a clutch housing 14 at the right end of the shaft. Similarly, bearing 20 supports the left end of shaft 16 and is located within the transmission housing 12.

Formed integrally with the shaft or carried thereon are five torque input gears shown respectively at 22, 24, 26, 28, 30. These form a torque delivery path during operation in low speed ratio, reverse, second speed ratio, third speed ratio and fourth speed ratio, respectively. An end cover plate 32 is bolted to the end of the transmission housing 12 and seals the inner space of the transmission from the outside environment. A reverse idler support shaft 36 arranged with its axis parallel to the axis of shaft 16 is journalled within openings 38 and 40 formed in housing 12 and 14 and supports a reverse drive idler 42 that is arranged to engage the reverse gear 24 when the reverse idler support shaft is moved to the right as shown in FIG. 1. Reverse idler 42 is secured to shaft 36 and the journalled support given the shaft allows for axial movement. In this way linear displacement of idler 42 causes the shaft 36 to move axially with the journalled supports, and idler rotation causes the shaft 36 to rotate within the journals. A bolt 50 threaded through the thickness of housing 14 provides a pivot surface for the reverse idler bellcrank 48, which has a boss 52 formed thereon and a bore through the boss into which bolt 50 is fitted. An operating arm of bellcrank 48 extends upwardly from the axis of bolt 50 to a pin 54 extending from the end of the arm and arranged to seat within an annular groove 46 of the idler hub 44. At the opposite end of bellcrank 48 from the location of the pin 54 is a slot 56 formed at the extremity of the bellcrank. Slot 56 extends through the thickness of the arm and is capable of receiving either of two control elements that may be inserted into the slot from either direction normal to the outer surfaces of bellcrank 48. FIG. 1 illustrates in phantom the capability of bellcrank 48 to pivot about the axis of bolt 50, which pivoting causes axial sliding of the reverse drive idler support shaft 36. In response to this motion the reverse idler 42 is moved axially into engagement with the reverse torque input gear 24. The pivoting motion of bellcrank 48 is produced by the engagement of slot 56 with a control element later to be described.

Figure 3:
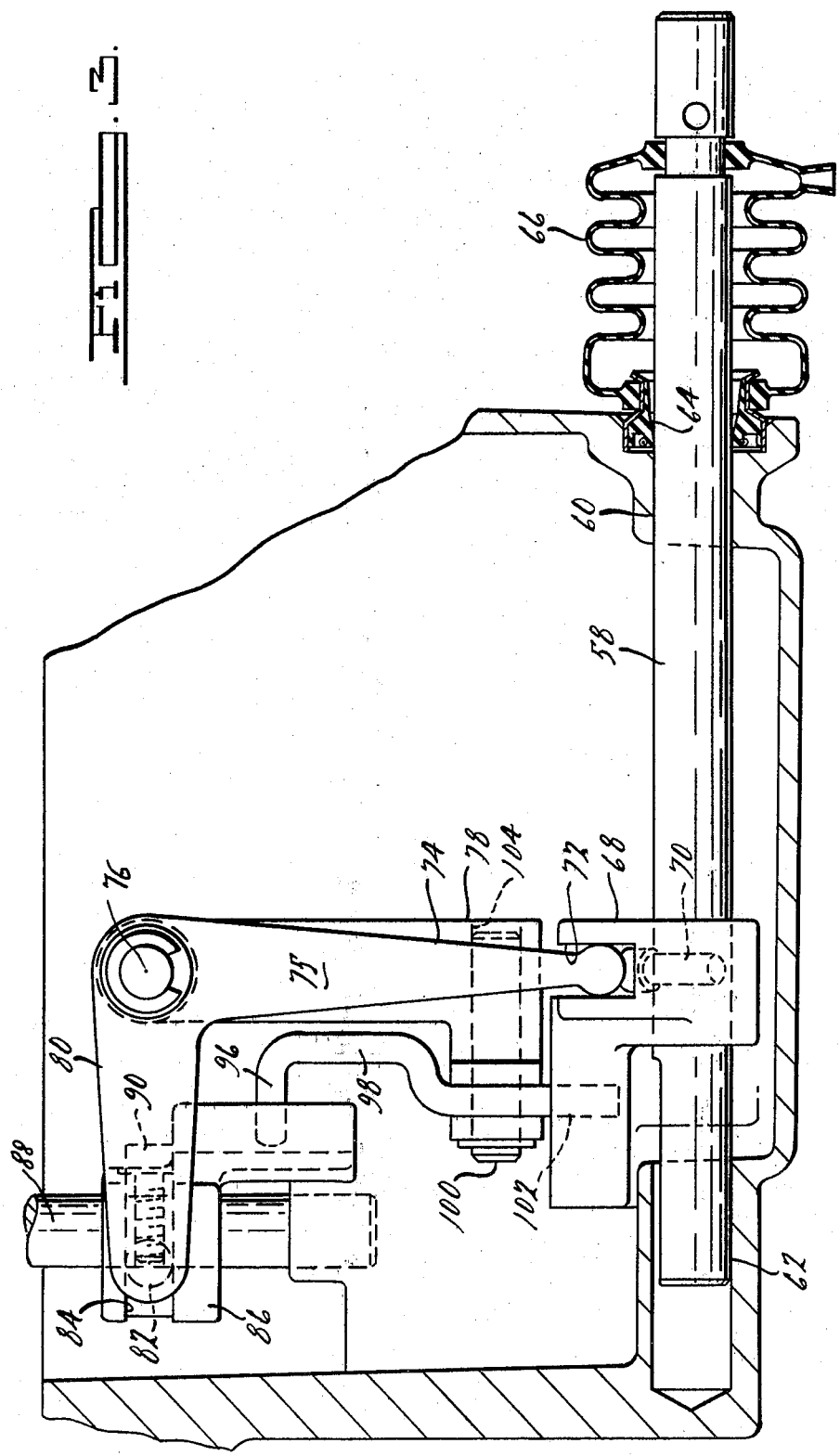
FIG. 3 is a partial cross-section of the reverse drive pinion shift mechanism taken at plane II—II of FIG. 2.

FIG. 3 illustrates in part the shift mechanism construction for controlling the motion of the reverse drive idler 42. The shift mechanism includes a main shift selector shaft 58 journalled within openings 60, 62 formed in the housing for supporting the shaft 58 and allowing rotation about its central axis and sliding movement relative to the housing. The journal opening 60 is provided with a fluid seal 64 and a protective flexible boot 66, which boot accommodates both the axial motions of the shaft 58 and its rotation about the centerline. A selector block 68 is secured to the shaft 58 by way of a locking bolt 70 and is furnished with a slot 72 directed radially outwardly from the shaft centerline. Within slot 72 is positioned the rounded end of a bellcrank lever arm 74. Pivot shaft 76 journalled within an axial bore formed in stationary bracket 78 allows rotation of the bellcrank 75 about the axis of pivot shaft 76. Bellcrank 75 includes a second arm 80 extending radially outward from the axis of shaft 76 and generally perpendicular to crank arm 74. Fixed to the end of arm 80 and extending transversely outwardly therefrom is a pin 82, which is arranged to fit within a slot 84 formed on a selector block 86. Operationally, when the main shift selector shaft is caused to displace axially, arms 74 and 80 can oscillate about the axis of pivot shaft 76 thereby producing a longitudinal movement of the selector block 86. The shift rail 88, to which selector block 86 is fixedly attached by way of the locking bolt 90, and block 86 are displaced as a unit due to rotation of bellcrank 75 because the journalled support furnished by the housing allows axial as well as rotational movement of the shift rail.

Figure 4:
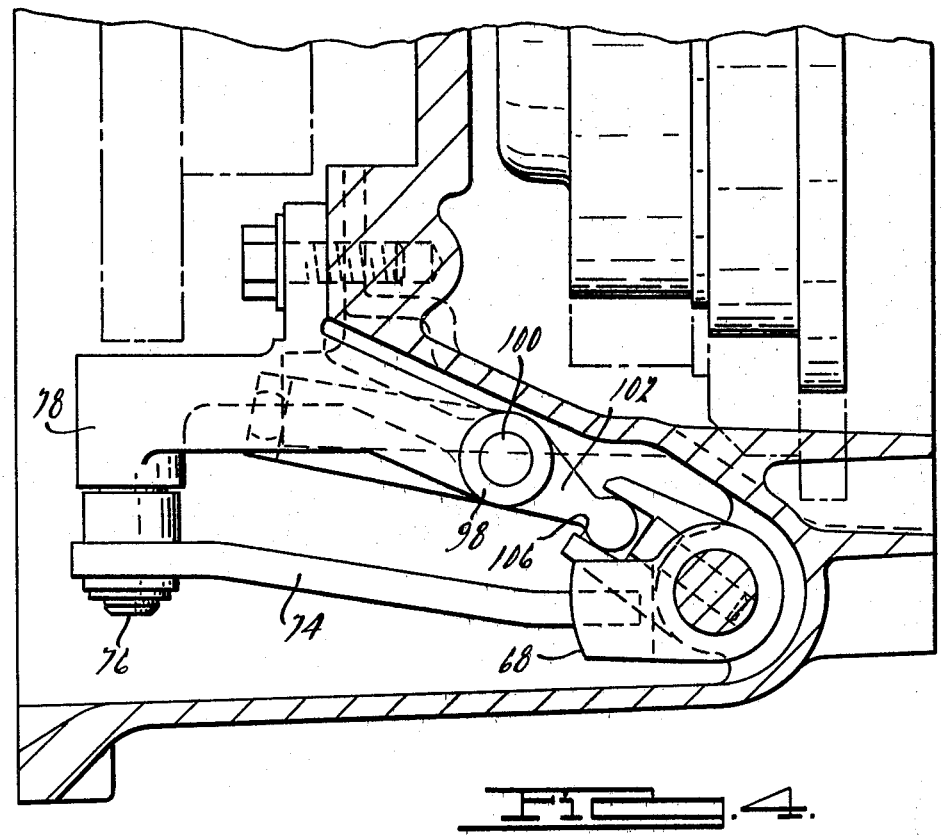
FIG. 4 is a partial cross-section of the reverse drive pinion shift mechanism taken at plane 4—4 of FIG. 2.

Selector block 86 is formed with a second slot 92 extending generally at right angles to slot 84. Slot 92 receives the rounded end 94 of bellcrank lever arm 96, which is best seen by referring to FIGS. 2 and 3. Crank arm 96 is a part of the bellcrank 98 that rotates about pivot shaft 100 and provides, at its end opposite arm 96, a second bellcrank arm 102. Shaft 100 is journalled within a bore 104 formed on the stationary bracket 78. Arm 102 engages a longitudinally directed slot 106 formed on selector block 68, which engagement is best illustrated in FIG. 4.

Thus, when the main shift selector shaft 58 rotates about its longitudinal axis, selector block 68 rotates also and drives crank arm 102 to produce rotation of crank arm 98 about pivot shaft 100. Because of the engagement of end 94 in slot 92 of selector block 86, block 86 is caused to rotate about the axis of shift rail 88 as the main shift selector shaft rotates. The length of slot 92 is such that axial movements of the shift rail 88 provided by shift selector shaft 58 axial motion can be accommodated without causing end 94 of crank arm 96 to disengage slot 92. Through the action of bellcrank 98, rotary motion of shaft 58 is translated into rotary motion of selector block 86 and shift rail 88, to which it is secured.

Figure 5:
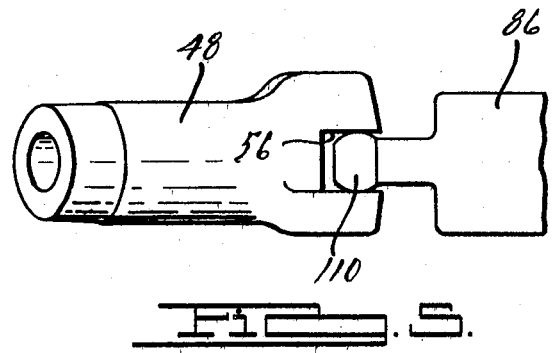
FIG. 5 is a side elevation view showing an end of the idler engaging bellcrank and the shift block looking in direction 5 of FIG. 2.

FIGS. 2 and 5 illustrate the location of a radial arm 108 that extends outwardly from selector block 86 and has a truncated spherical end portion 110 formed on its outermost extremity. End portion 110 is capable of engaging the slot 56 that is formed on bellcrank 48 provided it is aligned with slot 56 and is rotated about the axis of shift rail 88 into slot 56.

FIG. 2 shows a reverse inhibitor 111 having an outer housing portion 112 that may be formed either integrally with the transmission housing 12 and clutch housing 14, or mechanically attached thereto. The walls of the housings form an inner housing portion 114 extending within the space defined by housings 12, 14. Extending along the length of housings 112, 114 is a central axial bore 116 defining a shoulder 118 between a larger diameter portion of bore 116 and a smaller diameter portion. Fitted within bore 116 is a plunger 120 having a headed end for engagement with shoulder 118. A mechanical spring 124 for biasing the plunger inwardly is located between the headed end of plunger 120 and an inner surface of bore 116. The inner end 128 of plunger 120 opposite the headed end is sized to engage slot 156 of bellcrank 48 when the bellcrank is in its neutral position.

When the shift selector shaft is set for driving engagement in a gear other than reverse gear, radial arm 108 of selector block 68 is rotated out of engagement with slot 56 of bellcrank 48 by reason of operator control exercised over the shift handle. In this operating condition, the force of spring 124 biases plunger 120 to an extreme inward position wherein the headed end 122 abuts shoulder 118. The length of plunger 120 is such that when the plunger is so positioned its inner end 128 will engage slot 56 thereby assuring that bellcrank 48 is fixed against rotation, and as a consequence of this, that idler 46 does not engage gear 24.

However, when the shift selector shaft 58 is positioned to produce a reverse drive engagement, radial arm 108 of the selector block 68 is aligned with slot 56. Then, in response to rotation of the shaft 58, the selector block 86 is rotated counterclockwise when viewed as in FIG. 2 causing the radial arm end 110 to operate on plunger 120 against the force of spring 124. This rotation causes the plunger 120 to retreat out of engagement with slot 56 by reason of the bearing contact between end 110 and the end 128 of plunger 120 during the process of engagement of slot 56 by the radial arm end portion 110. Finally, bellcrank 48 is made to rotate about the axis of pivot bolt 50 in a clockwise direction, viewed as shown in FIG. 1. This produces displacement of the reverse idler support shaft 36 in the direction of its central axis. This displacement is produced because of the bearing contact between pin 54 that extends from the end of cantilever crankarm 48 and slot 46 formed in hub 44 of the reverse idler 42. Rotation of bellcrank 48 allows pinion shaft 36 to move to the right as viewed in FIG. 1 and into driving engagement with reverse pinion 24.

The reverse inhibitor further provides a transmission backup lamp switch. Fitted within the bore 116 is a plunger 120 having a headed end upon which are mounted electrical terminals 122 that extend outwardly from the surface of the headed end. The terminals 122 are adapted to contact electrical receptacles 123 formed on the outer wall of bore 116. A connector 124 mounted on the outer housing 112 provides an electrical connection between the backup switch and the warning lamp. The terminals 122 engage the receptacles 123 when the plunger 120 is forced to withdraw within bore 116, thereby completing an electrical circuit that lights a warning lamp (not shown) mounted on the vehicle.

From this it can be seen that the plunger 120, when engaging the notch 56 of bellcrank 48, causes the electrical terminals 122 to be disengaged from the receptacles 123 thereby opening the circuit. However, when the shift selector shaft 58 and the associated mechanism for causing the idler 42 to engage the gear 24 is actuated, the spherical end portion 110 of the radial arm 108 is rotated into engagement with the bellcrank slot 56. This action produces a force in opposition to the force of spring 126 and causes the plunger 120 to move outwardly within bore 116. Electrical terminals 122 are thereby caused to contact receptacles 124 and in this way the electrical circuit is completed. On the instrument panel, the completion of the circuit can produce a warning indication that the transmission selector shaft is positioned so that the idler 42 is in driving engagement with gear 24. Alternatively, a warning lamp mounted on the exterior of the vehicle will provide an identical indication of the disposition of the transmission for reverse drive.

Changes and modifications in the specifically described embodiments can be carried out without departing from the scope of the invention. For example, whereas the inhibitor has been described with respect to its interaction with the gear shift mechanism in producing a reverse drive condition, it could be adapted to produce a sensible indication of the transmission being arranged for forward drive in any of its speed ratios. The forward speed ratio drive paths can be inhibited against inadvertent engagement by the device of this invention as well as the reverse drive path, as described.

Having thus described preferred embodiments of my invention, what I desire and claim by U.S. Letters Patent is:

1. In a power transmission having a movable pinion adapted to establish driving engagement with a gear, a gear shift mechanism for establishing and disestablishing the driving engagement, comprising:
   a first lever mounted for rotation about an axis adapted to cause engagement and disengagement of the pinion and the gear;
   a selector shaft adapted for angular rotation and linear displacement responsive to operator control;
   locking means adapted to engage said first lever and to prevent rotaion of said first lever;
   means forming a connection between said first lever and said selector shaft for producing linear displacement of the pinion in response to linear displacement of said selector shaft and disengagement of said locking means from said first lever in response to rotation of said selector shaft, whereby the pinion is moved into driving engagement with the gear in response to linear movement of said selector shaft.

2. The combination as set forth in claim 1, wherein said first lever includes a support shaft providing a surface upon which said lever may rotate, means for engagement by said locking means and means for moving the pinion into and out of engagement with the gear.

3. The combination as set forth in claim 2, wherein said first lever further includes:

a first arm adapted to engage and move the pinion into engagement and disengagement with the gear as said first lever rotates; and a second arm adapted for blocking engagement by said locking means and for engagement by said connection means whereby the pinion is moved in response to selector shaft control.

4. The combination as set forth in claim 1, wherein the locking means comprises:

a plunger adapted for movement into and out of engagement with said first lever;

spring means biasing said plunger into engagement with said first lever; and means for producing a sensible indication that said first lever is engaged by said connection means.

5. The combination as set forth in claim 4, wherein said plunger is moved out of engagement with said first lever by movement of said connection means in response to said selector shaft movement.

6. The combination as set forth in claim 4, wherein said plunger is moved into engagement with said first lever by the biasing action of said spring when said connection means is disengaged from said first lever in response to said selector shaft movement.

7. The combination as set forth in claim 1, wherein the means forming a connection between said first lever and said selector shaft comprises:

a shift rail having a longitudinal axis, adapted for linear displacement in the direction of said axis and rotation about said axis;

a first block secured to said shift rail having an arm extending radially outward from the axis thereof for disengaging said locking means from said first lever and causing said radial arm to engage said first lever; and means pivoted on a stationary portion of said transmission having operating ends engaged respectively with said selector shaft and said shift rail whereby axial movement of said selector shaft produces linear displacement of said shift rail and rotation of said selector shaft produces rotation of said shift rail.

8. The combination as set forth in claim 7, wherein said pivoted means includes:

a second lever pivoted on a stationary portion of said transmission having its operating ends engaged respectively with said selector shaft and said shift rail whereby axial movement of said selector shaft produces linear displacement of said shift rail; and a third lever pivoted on a stationary portion of said transmission having one of its operating ends engaged with said selector shaft and another end engaged with said shift rail whereby rotation of said selector shaft produces rotation of said shift rail wherein said first block further includes a longitudinal slot aligned parallel to the axis of said shift rail engageable with one operating end of said third lever to cause rotation of said shift rail in response to rotation of said selector shaft; and a transverse slot aligned perpendicular to the axis of said shift rail engageable with one operating end of said second lever to cause linear displacement of the shift rail in response to axial movement of said selector shaft.

9. The combination as set forth in claim 8, wherein said second lever includes a support shaft providing a surface upon which said second lever may rotate, means on one operating arm thereof for engaging the transverse slot of said first block to produce linear displacement of said shift rail, and means on a second operating arm thereof for engaging said selector shaft whereby axial movement of said selector shaft produces linear displacement of said shift rail and linear displacement of the pinion.

10. The combination as set forth in claim 8, wherein said third lever includes a support shaft providing a surface upon which said third lever may rotate; means on an operating arm thereof for engaging the longitudinal slot of said first block to produce rotation of said shift rail about its longitudinal axis; and means on a second operating arm thereof for engaging said selector shaft whereby rotation of said selector shaft produces rotation of said shift rail about its longitudinal axis and engagement of said radial arm with said first lever.

* * * * *